Sept. 20, 1938.         E. FROBÖSE         2,130,882
MAGNETIC TESTING DEVICE
Filed Nov. 22, 1934
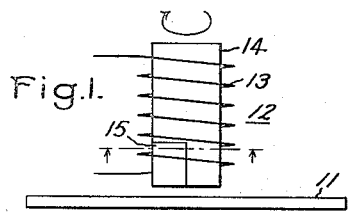
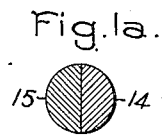
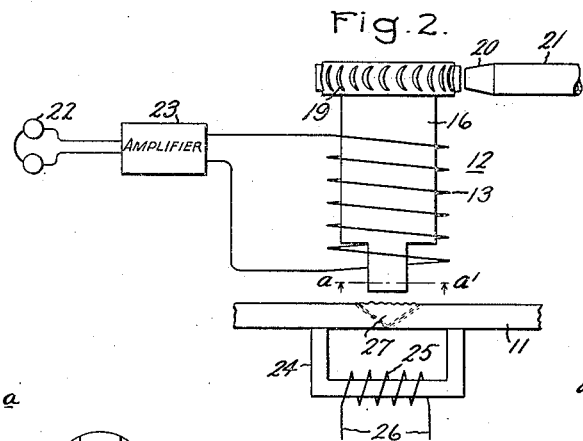
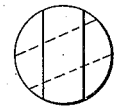
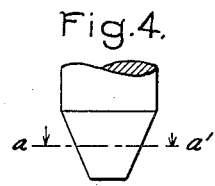
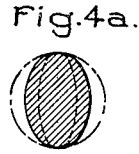
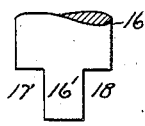
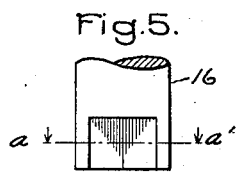
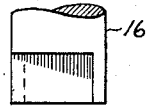
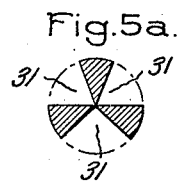
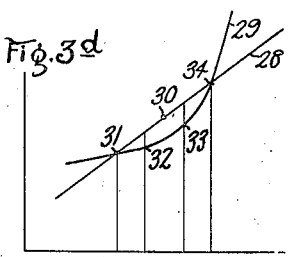
Inventor:
Ernst Froböse,
by *Harry E. Dunham*
His Attorney.

Patented Sept. 20, 1938

2,130,882

UNITED STATES PATENT OFFICE 2,130,882

MAGNETIC TESTING DEVICE

Ernst Froböse, Berlin-Oberschoneweide, Germany, assignor to General Electric Company, a corporation of New York Application November 22, 1934, Serial No. 754,232
In Germany January 8, 1934

4 Claims. (Cl. 175—183)

My invention relates to magnetic testing devices and methods and has for its principal object the location of defects in magnetic materials and the discovery of defective welds between members composed of magnetic materials.

It is an object of my invention to provide an arrangement for detecting variations in the normal components of magnetic field or of leakage flux in the proximity of a tested object.

Another object of my invention is to provide a testing arrangement which is independent of the absolute values of leakage flux or stray field in the vicinity of the tested object.

Still another object is to provide an arrangement for detecting variations in the rate of change of field or flux with respect to distance measured along the test piece.

Other and further objects and advantages will become apparent as the description proceeds.

In carrying out my invention in its preferred form, an object or piece to be tested is magnetized preferably longitudinally and means are provided for detecting variations in the strength of the component of field normal to the surface of the tested object. The detecting device may consist of an electrical winding connected to a current-responsive device and having an eccentrically rotating or vibrating core. The core may consist of a rotating cylinder having a segment thereof cut away so that, as the cylinder rotates, the magnetic permeance of portions of the space in the electrical winding varies and there is a tendency for voltages to be induced in the winding if the magnetic field due to leakage flux is not uniform.

In order to make the response independent of the absolute value of the leakage flux or the stray field, the segments cut from the cylindrical core may be symmetrical with respect to the axis of the core or radially symmetrical so that the average value of the flux in various portions of the core is constant if the rate of variation in field along the test piece is uniform. However, if the rate of variation in field is not uniform, voltage will be induced in the winding for reasons to be explained. In this way, the device is made to respond only in case of defect and no response is obtained as a result of the normal field gradient along a homogeneous test piece.

The features of my invention which I believe to be novel and patentable will be pointed out in the claims appended hereto. A better understanding of my invention may be obtained by referring to the following description taken in connection with the accompanying drawing in which Fig. 1 represents schematically a flaw detector responsive to the absolute value of leakage flux or stray field; Fig. 1a is a cross-section through a portion of the core of the detecting device shown in the arrangement of Fig. 1; Fig. 2 represents diagrammatically one embodiment of my invention in which the detector has a symmetrical core to make the response independent of the absolute value of stray field; Fig. 2a represents a section of the core shown in Fig. 2 cut by the plane a—a'; Fig. 3a is a bottom view of the core shown in Fig. 2 with one position represented in full lines and another position represented in dotted lines; Fig. 3b is an elevation of the lower portion of the core in one position; Fig. 3c is an elevation of the lower portion of the core in another position; Fig. 3d is a graph explaining the principle of operation of the embodiment shown in Fig. 2; Fig. 4 illustrates a modified shape of magnetic core which may be used in the field detector; Fig. 4a represents a section cut through the core of Fig. 4 by the plane a—a'; Fig. 5 represents another form of core; and Fig. 5a represents the section cut across the core of Fig. 5 by the plane a—a'.

Referring now more in detail to the drawing in which like reference characters are used to designate like parts throughout, in Fig. 1 a specimen of magnetic material to be tested is shown at 11 and a device for detecting variations in field is shown at 12. The specimen 11 may be magnetized preferably longitudinally in any desired manner as by means of permanent magnets or electromagnets. If desired, the field remaining after the piece 11 has been magnetized may be employed for making the test.

The detecting device 12 consists of an electrical winding 13 having a rotating core 14 of magnetizable material with an eccentric portion 15 thereof cut away. If desired, the portion 15 may be filled in with a non-magnetic material, such as brass, or preferably some material having substantially the same density as the core 14.

It will be evident that if the component of magnetic field normal to the surface of the test piece 11 is not uniform along the test piece, the magnetic field within the winding 13 will not be uniform and more flux will thread the winding 13 when the core 14 is in the position with the greater amount of iron in the portion of the space within the winding 13 in which the field strength is greater. Less flux will thread the winding 13 when the non-magnetic portion 15 of the core 14 is toward the side of the winding 13 where the field strength is greater. Consequently, rotation of the core 14 will produce variations in flux threading the winding 13 and a voltage will be induced in the winding 13. If there are no defects in the piece 11, the field gradient along it will be uniform and no change in voltage induced in winding 13 will be perceived as the detector 12 is moved along the piece 11. However, if there is a defect in piece 11, there will obviously be an abrupt change in the leakage flux at the defect and consequently an abrupt change in the component of magnetic field normal to the piece 11 at the defective point. This abrupt change will necessarily result in an abrupt variation in the voltage induced in the winding 13 which will be perceptible if suitable means, such as a telephone receiver, is used to indicate the voltage induced in the winding 13.

It is evident, however, that since the voltage induced in the winding 13 depends upon the degree magnetization of the piece 11 it will be necessary to distinguish between variations in induced voltage produced by variations in the amount of magnetization of the piece 11 and those caused by defects therein. This may make the discovery of defects difficult, particularly if it is desired to magnetize the piece 11 very strongly in order to increase the sensitivity of the device. In such cases I prefer to modify the shape of the rotating core 14 by making the portions cut away from the cylinder symmetrical with its axis of rotation or with a plane through the axis of rotation. A suitable form of core is shown, for example, in Fig. 2 at 16. Referring to Fig. 2a, it will be seen that symmetrical segments 17 and 18 have been cut away from the lower end of the core 16. Any suitable means may be employed for rotating the core 16 but in order to avoid electromagnetic effects, I prefer to avoid the use of an electric motor. I may employ an air motor, for example, consisting of blades 19 cooperating with a nozzle 20 which is supplied with compressed air by tubing 21. The winding 13 may be connected to a pair of headphones 22 through any suitable type of amplifier 23 if desired, for the sake of increased sensitivity.

In the arrangement of Fig. 2, the test piece 11 may be strongly magnetized, if desired, by placing against it a magnetic yoke 24 having a current-conducting winding 25 supplied by a suitable source of current 26. Fig. 2 illustrates the application of the invention to detecting flaws in a weld 27 in the piece 11.

The operation of the apparatus shown in Fig. 2 will more readily be understood by referring to Fig. 3 in which I have shown a portion of the core 16 in two different angular positions. In Fig. 3a is shown an end view; Fig. 3b is an elevation in one angular position represented by the full lines in the end view 3a; Fig. 3c is an elevation in another angular position represented by the dotted lines in view 3a and; Fig. 3d is a graph representing flux or field strength plotted along the vertical axis against distance l along a test piece plotted along a horizontal axis.

The curve 28 represents a uniform variation in field strength which might be produced in the vicinity of a test piece 11 without a flaw. Variation in stray field along the test piece is to be expected owing to the magnetic potential gradient within the test piece itself.

The curve 29 represents, for the purpose of illustration, an abrupt variation in the normal component or stray field resulting from a defect in the piece. A defect in the test piece necessarily introduces a great increase in reluctance in the test piece at the point where the defect occurs and, consequently, forces a greater amount of flux outside of the test piece, adding to the leakage flux and therefore abruptly increasing the normal component of the stray field.

The point 30 represents the average value of the curve 28 across the width of the core 16 of the detector unit 12. It is apparent that the average value of the field acting in the two cut-away portions 17 and 18 of the core 16 in the position of Fig. 3b is the same as the average value of the curve 28 shown at point 30. This is also the average value of the field acting on the remaining portion 16' of the core 16. When the core 16 rotates to the position of Fig. 3c, owing to the fact that the curve 28 is linear, the average value of the field acting in portions 17 and 18 of the core 16 as well as in the portion 16' is still equal to the value represented by the point 30 although the location of the portions 17 and 18 has changed. Consequently, there is no change in flux induced in the core 16 and no voltage is induced in the winding 13 as the core 16 rotates.

If, however, the stray field varies non-linearly as shown in the curve 29, the average value of the segments 31—32 and 33—34 of the curve 29 corresponding to portions 17 and 18 respectively of the core 16 in the position of Fig. 3b will obviously not be equal to the average value of the curve 29 across the entire face of the core 16, or from point 31 to point 34. When the core 16 is in the position of Fig. 3c the average field acting on portions 17 and 18 is of course the average curve 29 from point 31 to point 34. Consequently as the core 16 rotates from the position of Fig. 3b to the position of Fig. 3c the total flux threading the windings 13 will be changed and a voltage will be induced in winding 13 by rotation of the core 16. A sound will therefore be heard in the phones 22 when the detector 12 is brought in proximity to a defect but no sound will be heard when the detector is adjacent homogeneous portions of the test piece 11. Since the response of the detector 12 depends upon variations in the rate of change of stray fields along a test piece and is independent of the absolute value of the stray field, it is apparent that variations in the distance between the test piece 12 and the detector 12 as the latter is moved along will not affect the indications obtained. Likewise a constant rate of change of the stray field strength does not affect the indications. The rate of change of stray field along the test piece may be designated by the mathematical name "derivative of stray field with respect to distance measured along the test piece". Similarly the rate of variation in the rate of change is the derivative of the derivative or the second derivative of stray field with respect to distance measured along the test piece.

Although I have shown what I regard as a suitable form of core in Fig. 2, it will be understood that I am not limited to this precise arrangement. My invention, obviously, includes any arrangement of vibrating or rotating core material in which the magnetizable parts are maintained symmetrical with respect to an axis or a fixed or a rotary plane through an axis. For example, I may use the form of core illustrated in Figs. 4 and 4a in which the lower end of the core tapers from a cylindrical section to an elliptical section. Another form of core which I have found suitable is illustrated in Figs. 5 and 5a in which sectors 31 are cut away from the lower portions of the core 16.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. In a magnetic testing system including means for longitudinally magnetizing an object of magnetic material to be tested, a detecting device adapted to be placed in proximity to the tested object so as to be responsive to the component of magnetic field normal to the object, said detecting device comprising an electrical winding having a cylindrical core of magnetic material with portions thereof cut away which are symmetrical with respect to the axis of the core, said core being mounted for rotation about its axis, and means responsive to current induced in said winding.

2. A magnetic testing device comprising an electrical winding, current responsive means connected thereto, and a core of magnetic material in the form of a cylinder with portions thereof cut away to form a radially symmetrical solid, said core being in inductive relation to said winding and being adapted to be rotated about its axis in a magnetic field to be examined.

3. A device for magnetically testing a test piece comprising an electrical winding, current responsive means connected thereto, and a core for said winding mounted for rotation about its axis having portions of equal reluctance movable in their relative position with respect to a test piece, and a portion of different reluctance, the arrangement being such that the portions of equal reluctance remain symmetrical with respect to the axis of the remaining portion of the core when such relative movement occurs.

4. A method of testing an object composed of magnetic material which comprises magnetizing the object, passing a current-conducting winding along the object, varying the relative reluctance of portions of the space within the coil in such a manner while rotating the core about its axis that the portions of varying reluctance remain symmetrical with regard to the axis of the core, and observing the induction of current in the coil.

ERNST FROBÖSE.